(12) United States Patent
Tripoli et al.

(10) Patent No.: US 9,430,212 B2
(45) Date of Patent: Aug. 30, 2016

(54) AUTOMATICALLY GENERATING VOLUME IMAGES AND LAUNCHING VIRTUAL COMPUTING INSTANCES

(71) Applicant: Netflix, Inc., Los Gatos, CA (US)

(72) Inventors: Michael Tripoli, Gilroy, CA (US); Brian Moyles, Campbell, CA (US)

(73) Assignee: Netflix, Inc., Los Gatos, CA (US)

( * ) Notice: Subject to any disclaimer, the term of this patent is extended or adjusted under 35 U.S.C. 154(b) by 116 days.

(21) Appl. No.: 14/177,182

(22) Filed: Feb. 10, 2014

(65) Prior Publication Data

US 2015/0227355 A1    Aug. 13, 2015

(51) Int. Cl.
G06F 9/455    (2006.01)
G06F 9/45    (2006.01)
G06F 9/445    (2006.01)
H04L 29/08    (2006.01)

(52) U.S. Cl.
CPC ............ G06F 8/63 (2013.01); G06F 9/45533 (2013.01); H04L 67/1095 (2013.01); *G06F 2009/4557* (2013.01); *G06F 2009/45562* (2013.01)

(58) Field of Classification Search
CPC .... G06F 8/61; G06F 17/30088; G06F 9/455; G06F 8/63; G06F 9/45533; G06F 2009/45562; G06F 2009/4557; H04L 67/1095
See application file for complete search history.

(56) References Cited

U.S. PATENT DOCUMENTS

| | | | |
|---|---|---|---|
| 2009/0276771 A1* | 11/2009 | Nickolov | G06F 9/4856 717/177 |
| 2009/0328030 A1* | 12/2009 | Fries | G06F 8/63 717/174 |
| 2010/0192143 A1* | 7/2010 | Ingle | G06F 8/63 717/172 |
| 2010/0211944 A1* | 8/2010 | Kaneda | G06F 9/45533 717/174 |
| 2011/0153697 A1* | 6/2011 | Nickolov | G06F 9/4856 707/827 |
| 2011/0197053 A1* | 8/2011 | Yan | G06F 8/64 713/2 |
| 2011/0265076 A1* | 10/2011 | Thorat | G06F 8/65 717/172 |

(Continued)

OTHER PUBLICATIONS

Jinesh Varia, amazon webservices, Architecting for the Cloud: Best Practices, 2011, pp. 1-23.*

(Continued)

*Primary Examiner* — Thuy Dao
*Assistant Examiner* — Mongbao Nguyen
(74) *Attorney, Agent, or Firm* — Hickman Palermo Becker Bingham LLP

(57) ABSTRACT

In an embodiment, a method comprises using a first server computer, executing a process that is configured to generate virtual computer instances; receiving a request to generate a first custom virtual computer instance, wherein the request identifies one or more software packages to install on the first custom virtual computer instance; copying a first pre-configured volume image onto a volume of a data storage device, wherein the volume includes one or more base software packages in a file system; mounting the volume to the first server computer, in response to receiving the request; installing each of the one or more software packages on the volume; unmounting the volume; creating a snapshot of the volume; registering the snapshot as a registered custom volume image.

21 Claims, 8 Drawing Sheets

(56) References Cited

U.S. PATENT DOCUMENTS

| | | | | |
|---|---|---|---|---|
| 2011/0271270 | A1* | 11/2011 | Bowen | G06F 8/67 717/171 |
| 2012/0042159 | A1* | 2/2012 | Liu | G06F 9/45537 713/2 |
| 2012/0254370 | A1* | 10/2012 | Bacher et al. | 709/219 |
| 2012/0254861 | A1* | 10/2012 | Down, Jr. | G06F 9/45558 718/1 |
| 2012/0260250 | A1* | 10/2012 | Maeda et al. | 718/1 |
| 2012/0272240 | A1* | 10/2012 | Starks | G06F 9/45533 718/1 |
| 2012/0297181 | A1* | 11/2012 | Lee | G06F 8/68 713/2 |
| 2012/0331463 | A1* | 12/2012 | Orveillon | G06F 8/63 718/1 |
| 2013/0007739 | A1* | 1/2013 | Poddar | G06F 8/63 718/1 |
| 2013/0086585 | A1* | 4/2013 | Huang et al. | 718/1 |
| 2013/0132942 | A1* | 5/2013 | Wang | G06F 9/45504 717/176 |
| 2013/0232484 | A1* | 9/2013 | Chieu et al. | 718/1 |
| 2013/0263127 | A1* | 10/2013 | y Arcas et al. | 718/1 |
| 2014/0095821 | A1* | 4/2014 | Yang et al. | 711/162 |
| 2014/0172783 | A1* | 6/2014 | Suzuki | G06F 8/63 707/609 |
| 2015/0052321 | A1* | 2/2015 | Ammons et al. | 711/162 |
| 2015/0058837 | A1* | 2/2015 | Govindankutty | G06F 9/45533 718/1 |
| 2015/0120669 | A1* | 4/2015 | Ibanescu | 707/649 |
| 2015/0222604 | A1* | 8/2015 | Ylonen | H04L 63/062 713/171 |

OTHER PUBLICATIONS

Noury Bouraqadi, Towards Small Portable Virtual Machine, 2010, pp. 1-11.*

Samuel T. King, Debugging operating systems with time-traveling virtual machine, 2005, pp. 1-15.*

Romain Wartel, Image Distribution Mechanisms in Large Scale Cloud Providers, 2010, pp. 1-6.*

* cited by examiner

AUTOMATICALLY GENERATING VOLUME IMAGES AND LAUNCHING VIRTUAL COMPUTING INSTANCES

FIELD OF DISCLOSURE

The present disclosure generally relates to techniques for launching custom virtual computing instances, and relates more specifically to techniques for generating customized volume images that can be used to launch customized virtual computers on one or more elastic virtual computer cloud systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Networked data centers managed by independent parties and having large numbers of reconfigurable computer processors, memory and storage—sometimes termed "cloud computing" facilities in which computing resources conceptually reside in an "elastic virtual cloud"—are commercially available from AMAZON, RACKSPACE and others. A user may allocate or deallocate computing resources in an elastic virtual computer cloud by launching and/or destroying virtual computer instances. A virtual computer instance may be launched using a snapshot of a previously configured volume with a basic operating system ("OS"), such as a UNIX distribution. After the virtual computer instance is launched, the user may manually configure the virtual computer instance by logging in to the instance from a client computer and configuring the instance as desired. For example, the user may log in to a launched virtual computer instance and install one or more software packages, setup one or more user profiles, and define one or more networking routes.

Manually launching and configuring virtual computer instances may be time consuming and prone to error. As an alternative, a user may store a snapshot of a virtual computer instance after the user configures the virtual computer instance. After the snapshot is stored, the user may generate and launch a new virtual computer instance from the stored snapshot. Since the new virtual computer instance is generated from the stored snapshot, the user need not configure the new virtual computer instance.

In many cases, however, a user may want to launch a new virtual computer instance that is configured differently from any snapshots that were previously stored. For purposes of illustrating a clear example, assume that a particular software package is installed on a virtual computer instance and a snapshot of the virtual computer instance is stored. Also assume that a new version of the particular software package is released. If the user wants to generate a new virtual computer instance with the new version of the software package, then the user may still have to manually launch and configure a new virtual computer instance with the new version of the software package.

SUMMARY

The appended claims may serve as a summary of the invention.

Figure 1:
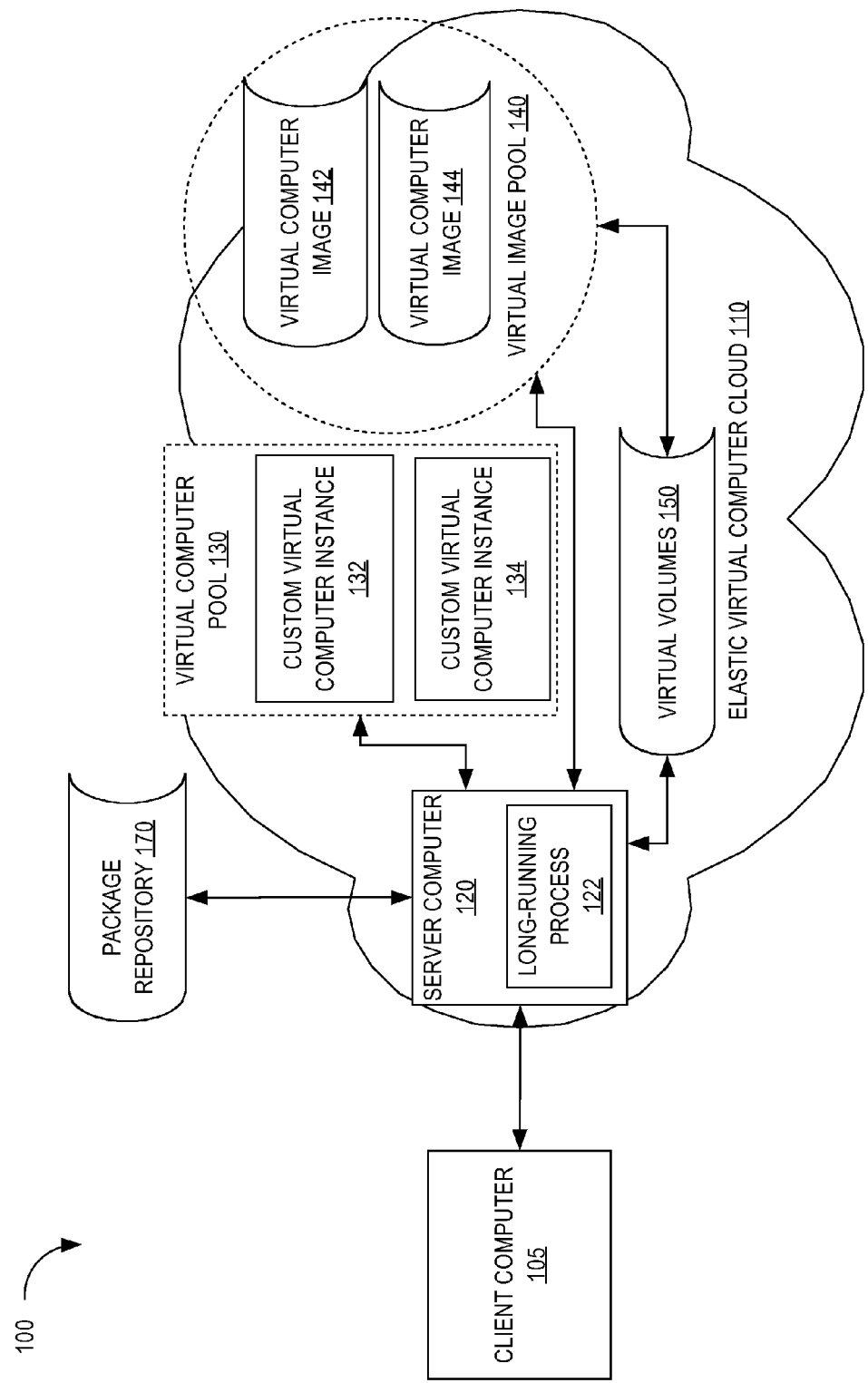
FIG. 1 illustrates a computer system for generating custom virtual computers, according to an embodiment.

While each of the drawing figures illustrates a particular embodiment for purposes of illustrating a clear example, other embodiments may omit, add to, reorder, and/or modify any of the elements shown in the drawing figures. For purposes of illustrating a clear example, each figure may be described with reference to one or more other figures, but using the particular arrangement(s) illustrated in other figures are not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Terms
2.0 General Overview
3.0 Network Topology
   3.1 Long-Running Process
   3.2 Server Computer
   3.3 Virtual computer pool
   3.4 Virtual Image Pool
   3.5 Virtual Volumes
   3.6 Client Computer
   3.7 Package Repository
4.0 Process Overview
   4.1 Generating a Custom Snapshot and Launching a Custom Virtual Computer Instance
      4.1.1 Selecting a Snapshot
      4.1.2 Configuring the Volume
      4.1.3 Creating and Registering a Snapshot of the Volume
      4.1.4 Launching a Custom Virtual Computer Instance
   4.2 Automatically Launching Custom Virtual Computer Instances
   4.3 Launching Custom Virtual Computer Instances Across Multiple Regions
   4.4 Providing a Service for launching Custom Virtual Computer Instances and Generating Custom Snapshots
5.0 Implementation Mechanisms—Hardware Overview
6.0 Other Aspects of Disclosure

1.0 Terms

A "computer" may be one or more physical computers, virtual computers, and/or computing devices. As an example, a computer may be one or more server computers, cloud-based computers, cloud-based cluster of computers, virtual computer instances or virtual computer elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

A "virtual computer" may be software, which when executed, manages one or more software packages and/or processes as if a physical computer. A virtual computer may comprise a file system that includes one or more installed software packages, such as an OS. One or more computers may be allocated to execute an instance of a virtual computer. Additionally or alternatively, a computer may be allocated to execute more than one virtual server instance.

A "virtual computer instance" is a virtual computer being executed on a computer.

"Launching a virtual computer instance" may mean causing a virtual computer instance to begin executing on a computer.

A "virtual computer image" or "snapshot" may be a copy of the state of a computer, volume, and/or file system at a particular point in time. The system and/or file system at the time of the snapshot may be stored in transitory and/or non-transitory memory.

A "virtual volume" may be a volume generated based at least in part on a snapshot.

A "base software package" may be a software package installed on a volume before a computer and/or virtual computer instance mounts the volume. Additionally or alternatively, a "base software package" may be a software package included in a snapshot.

A "custom virtual computer instance" may be a virtual computer instance that is generated in response to one or more requests for a virtual computer instance. A custom virtual computer instance may include one or more configurations and/or software packages identified in the one or more requests.

An "elastic virtual computer cloud" may comprise one or more computers executing one or more virtual computer instances. The one or more computers may be located in one or more particular regions.

A "process" means a process, thread, and/or instance of a program implemented as software and executed by a computer and/or virtual computer instance.

A "long-running process" may mean a process that receives and/or processes one or more requests, and waits to receive additional requests. A long-running process need not terminate merely because the received requests have been processed. For example, a long-running server process may be a process that runs on a server computer and/or a virtual computer, which receives a request from a client computer to perform one or more operations and/or return a result. After processing the request, instead of terminating, the long-running process may wait for additional requests.

A long-running process need not perform a request. For example, upon receiving a request, the long-running server process may assign the request to a process in a pool of other processes and/or a child process. The process that is assigned the request need not be a long-running process. The process assigned the request may terminate after processing the request. However, for convenience of expression, a long-running process "processing" a request and/or "performing" an operation may mean a long-running process, and/or a process managed by the long-running process, processing a request and/or performing an operation. The one or more processes managed by the long-running process need not be executed on the same one or more computers as the long-running process.

2.0 General Overview

In an embodiment, a method comprises using a first server computer, executing a process that is configured to generate virtual computer instances; receiving a request to generate a first custom virtual computer instance, wherein the request identifies one or more software packages to install on the first custom virtual computer instance; copying a first preconfigured volume image onto a volume of a data storage device, wherein the volume includes one or more base software packages in a file system; mounting the volume to the first server computer, in response to receiving the request; installing each of the one or more software packages on the volume; unmounting the volume; creating a snapshot of the volume; registering the snapshot as a registered custom volume image.

In an embodiment, the method comprises launching the first custom virtual computer instance from the volume; communicating data indicating that the first custom virtual computer instance is instantiated; receiving, at the process, a second request to generate a second custom virtual computer instance; determining that the second request identifies the one or more software packages installed on the registered custom volume image; in response to determining the one or more software packages are installed on the registered custom volume image: copying the registered custom volume image to a second volume; launching the second custom virtual computer instance from the second volume, without mounting the second volume onto the first server computer, installing the one or more software packages, and unmounting the second volume from the first server computer.

In an embodiment, the method comprises receiving a commit request, at a source code version control server computer, to commit a set of source code to a version control system; committing the set of source code to the version control system; determining that the set of source code was committed successfully, and in response, compiling the set of source code and generating a compiled software package; sending the request to the process to generate the first custom virtual computer instance; wherein the request identifies the one or more software packages that should be installed on the first custom virtual computer instance and includes the compiled software package; installing the compiled software package; running a set of tests against the compiled software package on the first custom virtual computer instance; generating a notification specifying which tests failed, if any.

In an embodiment, wherein the process is a first long-running process of a plurality of long-running processes and each long-running process of the plurality of long-running processes is being executed on a different server computer in a particular geographic region and is capable of launching one or more custom virtual computer instances at the particular geographic region, the request identifies a geographic region, and the method comprises executing a master process at a master server computer; receiving the request at the master process; determining that the first server computer is located in the geographic region identified in the request; sending the request to the first long-running process, executed by the first server computer, to instantiate the first custom virtual computer instance at the geographic region.

In an embodiment, the method comprises communicating data indicating a progress state of the process while the process is copying the first pre-configured volume image onto the volume, mounting the volume, installing the one or more software packages, unmounting the volume, and/or launching the first custom virtual computer instance.

3.0 Network Topology

FIG. 1 illustrates a computer system that may be used for generating custom virtual computers, according to an embodiment. In FIG. 1 system 100 includes client computer 105, elastic virtual computer cloud 110, and package repository 170. The cloud 110 includes a server computer 120 having a long-running process 122, virtual computer pool 130 having custom virtual computer instances 132, 134, virtual image pool 140 having virtual computer images 142, 144, and virtual volumes 150. All of the components 120 through 150 are located in elastic virtual computer cloud 110 and are communicatively coupled directly and/or indirectly through one or more other computers or devices included in elastic virtual computer cloud 110. For example, in FIG. 1, each of the components 120 through 150 is communicatively coupled through server computer 120. Furthermore, for purposes of illustrating a clear example, FIG. 1 shows a single client computer 105 and single other elements, but in practical embodiments there may be any number of clients and/or other elements and embodiments are specifically contemplated for use with thousands or millions of clients.

3.1 Long-Running Process

In an embodiment, the long-running process 122 is a long-running process that runs on server computer 120 and receives one or more requests from client computer 105 to launch one or more custom virtual computer instances such as instances 132, 134. In response to receiving a request to generate a custom virtual computer instance, long-running process 122 performs, and/or manages processes that perform, one or more of the methods discussed herein to launch a custom virtual computer instance on one or more server computers in virtual computer pool 130.

In FIG. 1, long-running process 122 is illustrated as a single long-running process running on a single computer. In other embodiments, long-running process 122 may comprise a plurality of long-running processes working in concert on one or more computers to receive requests and launch custom virtual computer instances as discussed herein. Additionally or alternatively, long-running process 122 may spawn a child process when a request for a custom virtual computer instance is received. The single long-running process may assign the received request to the child process. The child process may terminate after the child process launches the requested custom virtual computer instance according to one or more of the methods discussed herein.

3.2 Server Computer

Server computer 120 is a computer and/or a virtual computer hosted on elastic virtual computer cloud 110. In the embodiment illustrated in FIG. 1 server computer 120 is not included in virtual computer pool 130. However, in some embodiments, server computer 120 may be included in virtual computer pool 130. In an embodiment, functional units of server computer 120 may be implemented using any of the techniques further described herein in connection with FIG. 8; for example, the server computer may comprise a general-purpose computer configured with one or more stored programs which when executed cause performing the functions described herein for the long-running process 122, or a special-purpose computer with digital logic that is configured to execute the functions, or digital logic that is used in other computing devices. The use of a long-running process such as process 122 to implement the functions herein is merely one example that is not strictly required and other embodiments may use logic, programs, functional units or processes that are short-lived or active for any appropriate duration. The use of a long-running process is merely convenient for certain kinds of applications or contexts and may be inappropriate for others.

3.3 Virtual Computer Pool

Virtual computer pool 130 includes a plurality of virtual computers: custom virtual computer instance 132 and custom virtual computer instance 134. Virtual computer instances in virtual computer pool 130 are executed on one or more real computers, which are part of elastic virtual computer cloud 110.

3.4 Virtual Image Pool

Virtual image pool 140 includes a plurality of virtual computer images 142, 144. Virtual computer images 142, 144 in virtual image pool 140 may be copied to virtual volumes 150. Typically the virtual computer images 142, 144 can be executed to provide a substantive application or service that is useful to client computer 105. For example, the virtual computer images 142, 144 may include a web application server with stored pages and programs, database server, or other elements that cooperate to provide a web-based service to the client computer 105.

Virtual computer image 142 and virtual computer image 144 may be snapshots of previously configured virtual computer instances. For example, virtual computer image 142 may be a file system that has a first OS installed, and virtual computer image 144 may be a file system that has a second, different OS installed. Virtual computer image 142 and virtual computer image 144 may have other differences. For example, virtual computer image 142 may be a snapshot of a file system with a particular base software package. Virtual computer image 144 may be a snapshot of a file system without the particular base software package. Also for example, virtual computer image 142 may be a snapshot of a virtual computer instance with one or more user profiles and/or login credentials stored. However, virtual computer image 144 may be a snapshot of a virtual computer instance without the same one or more profiles and/or login credentials stored. Therefore, a virtual computer image launched from virtual computer image 142 may have the user profiles and/or login credentials stored and/or configured. However, a virtual computer image launched from virtual computer image 144 may not have the user profiles and/or login credentials stored and/or configured.

3.5 Virtual Volumes

Virtual volumes 150 may store one or more volumes. Each of the volumes stored on virtual volumes 150 may be mounted by server computer 120, and accessed by long-running process 122 as an attached device. Each of the volumes stored on virtual volumes 150 may be mounted by custom virtual computer instance 132, custom virtual computer instance 134, and/or a computer executing a custom virtual computer instance on elastic virtual computer cloud 110, as an attached device and/or drive.

3.6 Client Computer

Client computer 105 is a computer separated from the cloud 110 and coupled thereto directly or indirectly using one or more networks, and typically is operated by a user. Client computer 105 is illustrated as if external to elastic virtual computer cloud 110; however, client computer 105 need not be external to elastic virtual computer cloud 110.

For example, client computer 105 may be a virtual computer in virtual computer pool 130. In some embodiments, client computer 105 and cloud 110 are associated with different entities, which may be different business entities, but such an association is not required and these elements may be co-located or part of the same entity.

3.7 Package Repository

Package repository 170 includes one or more software packages stored on one or more computers. The software packages stored on package repository 170 may be installed on a virtual volume in virtual volumes 150 and/or a server computer in virtual computer pool 130. In the embodiment illustrated in FIG. 1, package repository 170 is external to elastic virtual computer cloud 110; however, package repository 170 need not be external to elastic virtual computer cloud 110.

4.0 Process Overview

To generate a custom virtual computer instance, a long-running process may perform one or more of the following steps: receive a request to generate a custom virtual computer instance with one or more software packages, select a snapshot, generate and configure a volume based the snapshot, take a snapshot of the configured volume, register the snapshot, and launch an custom virtual computer instance based on either the registered snapshot and/or the configured volume. The registered snapshot may be used to generate and/or launch subsequent custom virtual computer instances on one or more elastic virtual computer clouds in one or more geographic regions. Additionally, the long-running process may be implemented as a service over HTTP, SPDY, and/or any other networking protocols.

Figure 2:
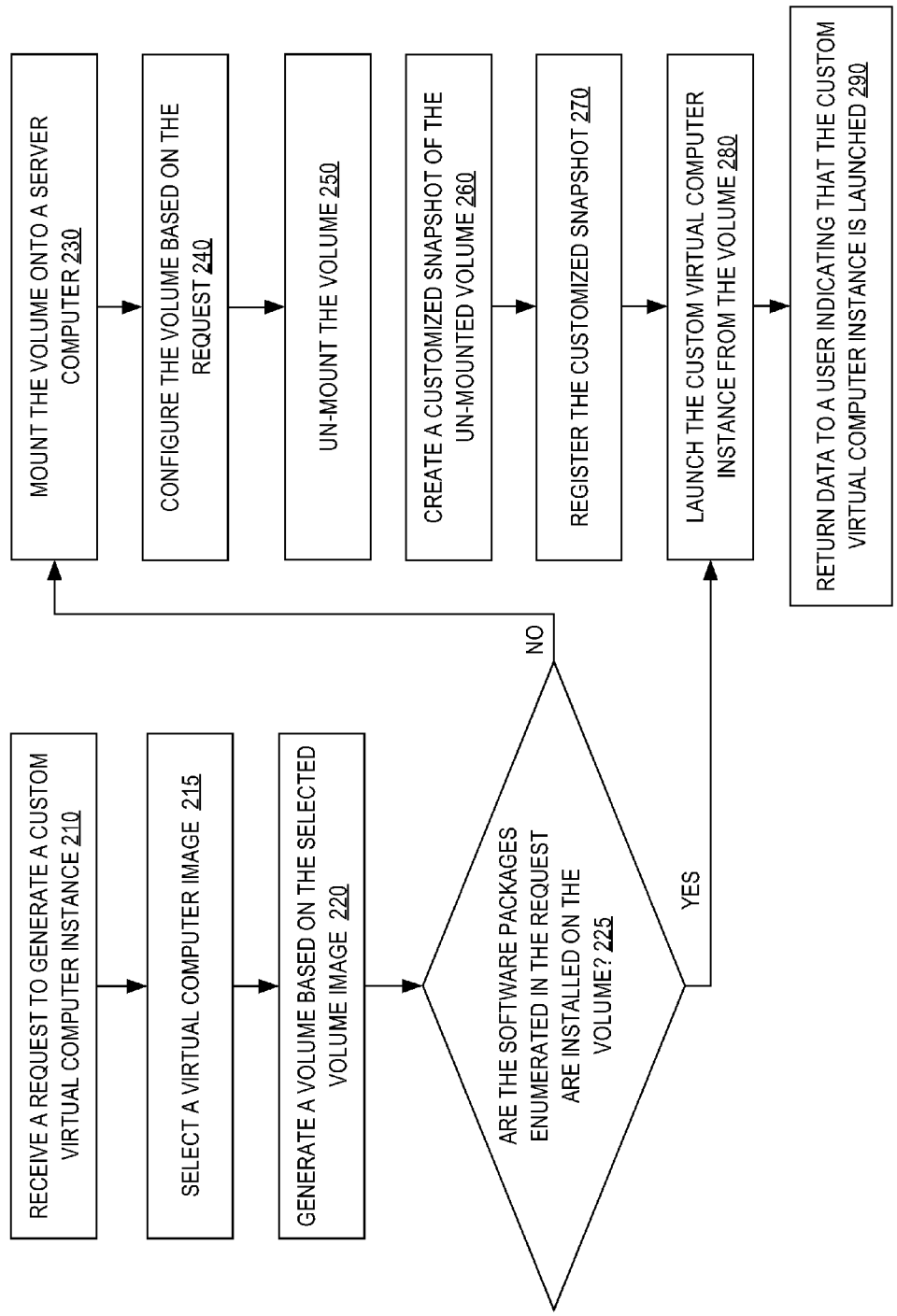
FIG. 2 illustrates a process for generating a custom virtual computer instance in response to a request from a client computer, in an example embodiment.

4.1 Generating a Custom Snapshot and Launching a Custom Virtual Computer Instance FIG. 2 illustrates a process for generating a custom snapshot and launching a custom virtual computer instance in response to a request from a client computer, in an example embodiment. FIG. 2 may represent, for example, functional logic of the long-running process 122 or the logic for one or more stored programs that the server computer 120 executes. In step 210, the process receives a request to generate a custom virtual computer instance. For example, long-running process 122 may receive a request to launch a custom virtual computer instance from client computer 105. The request may identify what OS and/or one or more software packages that should be installed on the requested custom virtual computer instance. For purposes of illustrating a clear example, assume that the request identifies a particular version of an OS and three additional software packages that should be installed.

4.1.1 Selecting a Snapshot

In step 215, the process selects a virtual computer image. For purposes of illustrating a clear example, assume that virtual computer image 142 is a snapshot of a virtual computer's file system that has the particular version of the OS and two of the three additional software packages identified in the request. Further assume that virtual computer image 144 is a snapshot of a virtual computer's file system that has the particular version of the OS, but only one of the three additional software packages identified in the request. Long-running process 122 may select virtual computer image 142, since the base software packages (the particular OS and two of the three additional, requested software packages) included in virtual computer image 142 are a closer match to the request than the base software packages (the particular OS and one of the three additional, requested software packages) included in virtual computer image 144.

Additionally or alternatively, long-running process 122 may select the virtual computer image 142 that has the fewest number of additional unrequested software packages installed. For purposes of illustrating a clear example, assume that virtual computer image 142 and virtual computer image 144 includes the particular OS and the same three software packages in the previous example. Also assume that virtual computer image 142 has twenty other software packages installed that are not identified in the request. Long-running process 122 may select virtual computer image 144, if virtual computer image 144 has fewer additional, unnecessary base software packages installed than virtual computer image 142.

In step 220, the process generates a volume based on the selected virtual computer image. For purposes of illustrating a clear example, assume long-running process 122 selected virtual computer image 142 in step 215. Accordingly, long-running process 122 may generate a volume on virtual volumes 150 by copying virtual computer image 142 onto virtual volumes 150.

In step 225, the process determines whether the software packages enumerated in the request are installed on the volume. Again, long-running process 122 may perform the test of step 255. If the result is positive or true, then long-running process 122 may proceed to step 280, and skip steps 230 through 270, which comprise configuring the volume, taking a snapshot of the configured volume, and registering the snapshot. Otherwise, if the test of step 225 is negative or false, then the process may proceed to step 230.

4.1.2 Configuring the Volume

In step 230, the process mounts the volume onto a server computer. For example, long-running process 122 mounts, or causes to mount, the volume in step 220 onto server computer 120. Mounting a volume on an already running server computer 120 may reduce the amount of time to configure the volume because long-running process 122 need not wait for a new computer to load and/or virtual computer instance to be launched.

In step 240, the process configures the volume based on the request. Continuing with the previous example, in one embodiment, long-running process 122 may change the root directory of server computer 120 to be a directory on the volume mounted in step 230. Long-running process 122 may install the software packages enumerated in the request on the mounted volume relative to the new root directory on the volume. Long-running process 122 need not install the software packages enumerated in the request that are already installed on the mounted volume.

Long-running process 122 may use a package manager to download and/or install one or more software packages from package repository 170. Additionally, the package manager, and/or other software, may attempt to cause the installed software package(s) to be executed. However, for purposes of generating a volume, the installed software packages need not be executed while the volume is mounted on server computer 120. Accordingly, long-running process 122 may prevent the installed software package(s) from being executed while mounted on server computer 120.

A process may perform additional operations on the volume. For example, long-running process 122 may copy authentication keys that allow users to login to a custom virtual computer instance based on the volume without having to setup an additional login and/or user profile each time a custom virtual computer instance based on the volume is launched.

Different mounted volumes may have different OSs installed. To support multiple OSs, long-running process 122 may maintain a plurality of plugins, wherein each plugin is associated with a particular OS. Thus, in the previous example, long-running process 122 may select a particular plugin associated with the OS pre-installed on the mounted volume. Long-running process 122 may use the selected plugin to configure the mounted volume: set the root directory, install software packages, configure user profiles, delete one or more log files, create and/or delete files and/or directories, and/or perform any other operations to configure the mounted volume.

In step 250, the process unmounts the volume. For example, long-running process 122 causes the volume mounted in step 230 to unmount, by calling an OS Application Programming Interface ("API").

4.1.3 Creating and Registering a Snapshot of the Volume

In step 260, the 1 process creates a customized snapshot of the unmounted volume. For example, long-running process 122 may generate virtual computer image 144 from the unmounted volume in virtual volumes 150 from step 250.

In step 270, the process registers the new customized snapshot. For example, long-running process 122 may store virtual computer image 144 in virtual image pool 140. Additionally or alternatively, elastic virtual computer cloud 110, server computer 120, long-running process 122, and/or virtual image pool 140 may maintain a database that describes base software packages installed on each virtual computer image stored in virtual image pool 140. Long-running process 122 may create one or more entries in the database, which indicate that virtual computer image 144 has base software packages identified in the request.

4.1.4 Launching a Custom Virtual Computer Instance

In step 280, the process launches a custom virtual computer instance from the volume. For example, long-running process 122 may mount the volume generated in step 240 to a computer in elastic virtual computer cloud 110. Additionally or alternatively, long-running process 122 may generate a volume from custom virtual computer image 144 and mount the volume on a particular computer in elastic virtual computer cloud 110. Long-running process 122 may launch custom virtual computer instance 134 on the particular computer using the mounted volume.

In step 290, the process sends data to the user indicating that the custom virtual computer instance is launched. For example, long-running process 122 may send data indicating that custom virtual computer instance 134 is launched to the computer from which the request was received from. The data may include the internet protocol address of custom virtual computer instance 134, login information, and/or any other information helpful to use and/or managing virtual computer instance 134.

In an embodiment, one or more virtual computer images and/or one or more custom virtual computer instances may be generated and/or launched concurrently. For example, long-running process 122 may spawn multiple processes, and each process may concurrently perform one or more of the steps discussed herein on a volume to which the process is assigned.

4.2 Automatically Launching Custom Virtual Computer Instances

Figure 3:
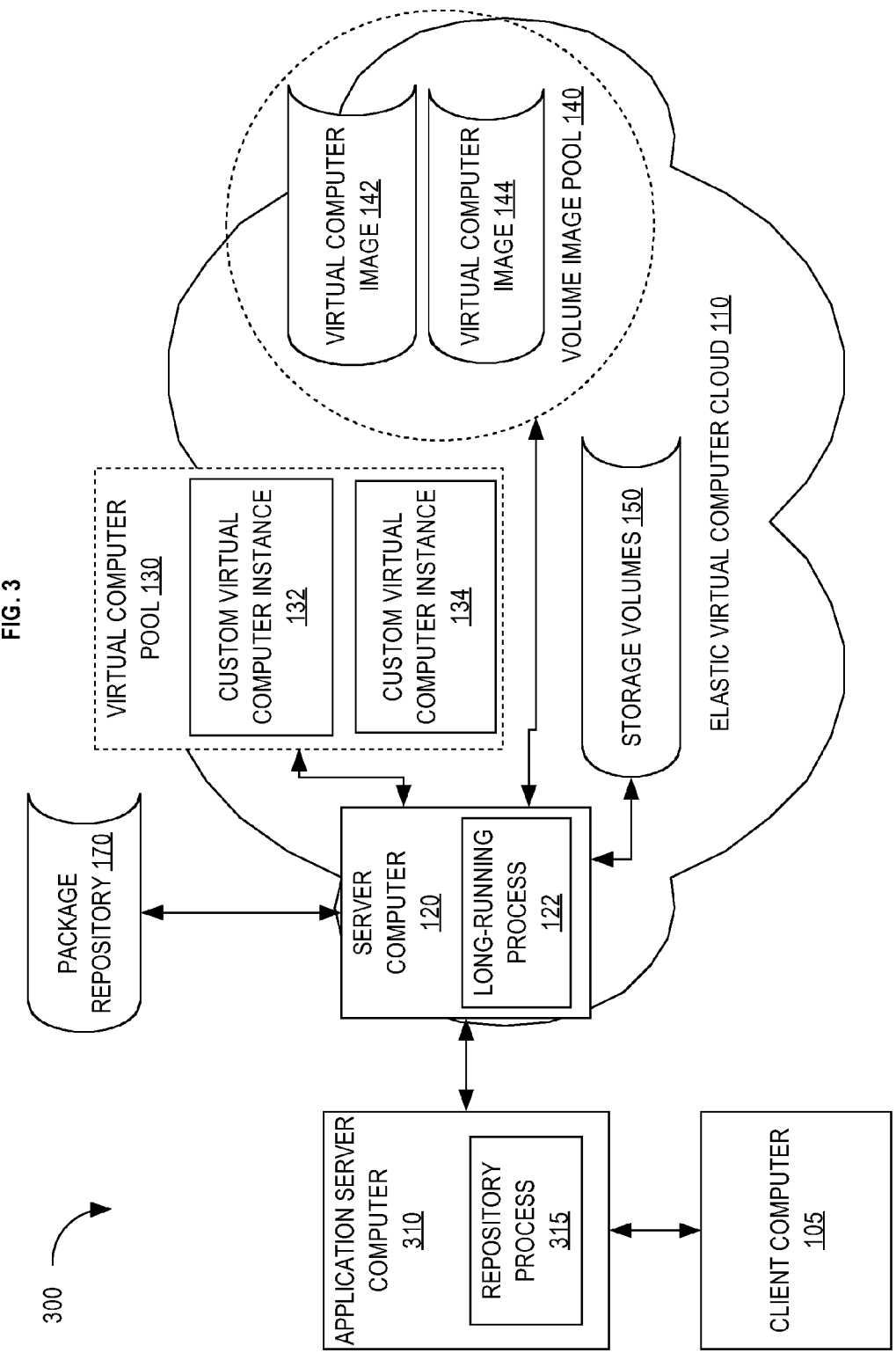
FIG. 3 illustrates a computer system for automatically generating custom virtual computers, according to an embodiment.

In some embodiments, virtual computer instances may be created and launched automatically. For example, FIG. 3 illustrates a computer system for automatically generating custom virtual computers, according to an embodiment. System 300 is similar to system 100 in FIG. 1; however, system 300 includes application server computer 310, which is communicatively coupled to long-running process 122 through server computer 120. While application server computer 310 is illustrated as if outside elastic virtual computer cloud 110, application server computer 310 may be a computer that is part of elastic virtual computer cloud 110.

Application server computer 310 may send one or more requests to launch custom virtual computer instances to long-running process 122. In response to a request from application server computer 310, long-running process 122 may generate and custom virtual computer instance. Additionally or alternatively, application server computer 310 may send long-running process 122 a request to generate a custom virtual computer instance based on data received from client computer 105.

Figure 4:
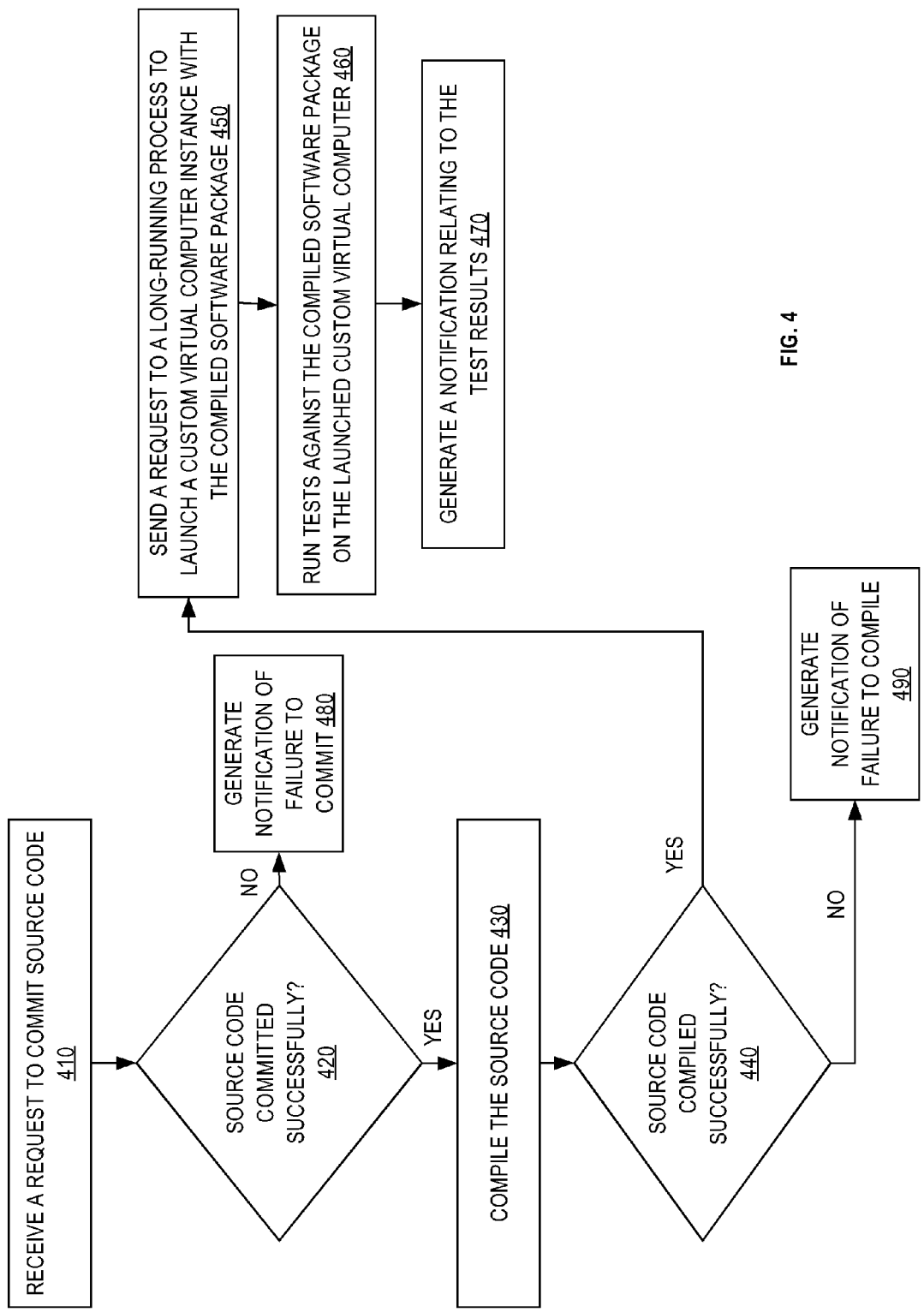
FIG. 4 illustrates a process for automatically generating a custom virtual computer, according to an embodiment.

FIG. 4 illustrates a process for automatically generating a custom virtual computer instance, according to an embodiment. For purposes of illustrating a clear example, assume that application server computer 310 executes repository process 315, which maintains a source code repository stored on application server computer 310. In step 410, a repository process executing on an application server computer receives a request to commit source code from a client computer. For example, repository process 315 may receive source code from client computer 105 through application server computer 310. In response, repository process 315 may attempt to commit the source code to a code repository.

In step 420, the repository process may determine whether the source code was committed successfully. If so, then control may proceed to step 430; otherwise, control may proceed to step 480. For example, if repository process 315 is unable to commit the received source code because of a merge conflict, then repository process 315 may proceed to step 480 and generate a notification of failure to commit. Repository process 315 may send the notification to client computer 105.

In step 430, the repository process may compile the source code. For example, repository process 315 may compile the most recent version of the source code in the repository, which may include the code received in step 410, to produce a compile software package.

In step 440, the repository process determines whether the source code was compiled successfully. If so, then control may proceed to step 450; otherwise, control may proceed to step 490. For example, if repository process 315 fails to compile the source code, then repository process 315 may generate a failure notification. Repository process 315 may send the failure notification to the client computer 105.

In step 450, the repository process sends a request to a long-running process to launch a custom virtual computer instance with the compiled software package. For example, repository process 315 may send a request to long-running process 122 to launch a custom virtual computer. The request may include data that identifies one or more software packages to install, including the compiled software package from step 430. The data may include the code version number. In response to the request, long-running process 122 may perform one or more of the methods discussed herein to launch custom virtual computer instance 134 with the compiled software package. In an embodiment, long-running process 122 installs the compiled software package by retrieving the compiled software package from application server computer 310. In an embodiment, long-running process 122 installs the compiled software package by retrieving the compiled software package from a package repository, such as package repository 170.

In step 460, a process runs tests against the compiled software package on the launched custom virtual computer instance. For purposes of illustrating a clear example, assume that a process executed by custom virtual computer instance 134 runs one or more tests against the particular software package installed from the checked in code. The one or more tests may be included in the particular compiled software package. Additionally or alternatively, the tests may be retrieved as a separate software package from package repository 170 or application server computer 310. Additionally or alternatively, the one or more tests may be one of, or part of one of, the base software packages installed on the volume used by custom virtual computer instance 134. Additionally or alternatively, the test may be retrieved and/or executed in response to a request by a user or another process. Step 460 broadly represents performing any of a variety of validation operations on the compiled package.

In step 470, the process generates a notification relating to the test results. For example, the test results may be sent to the user that checked in the source code in step 410. Additionally or alternatively, the test results may be sent to the development team and/or team leader(s) responsible for the code in the repository. Additionally or alternatively, the test results may be sent to a quality and assurance team. Additionally or alternatively, the custom virtual computer instance that is generated in response to committing code to a repository on application server computer 310 may be removed after the results are determined and/or sent to an administrator.

4.3 Launching Custom Virtual Computer Instances Across Multiple Regions

A virtual computer instance may have higher throughput and lower latency with a client computer that is topologically closer in the network. Networks that are geographically close may also be topologically close. Thus, a client computer downloading content from a custom virtual computer instance that is running on a geographically close computer may experience higher throughput and lower latency than if the custom virtual computer instance was running on a computer geographically further away from the client computer. Accordingly, custom virtual computer instances may be deployed on one or more regions on one or more elastic virtual computer clouds.

Figure 5:
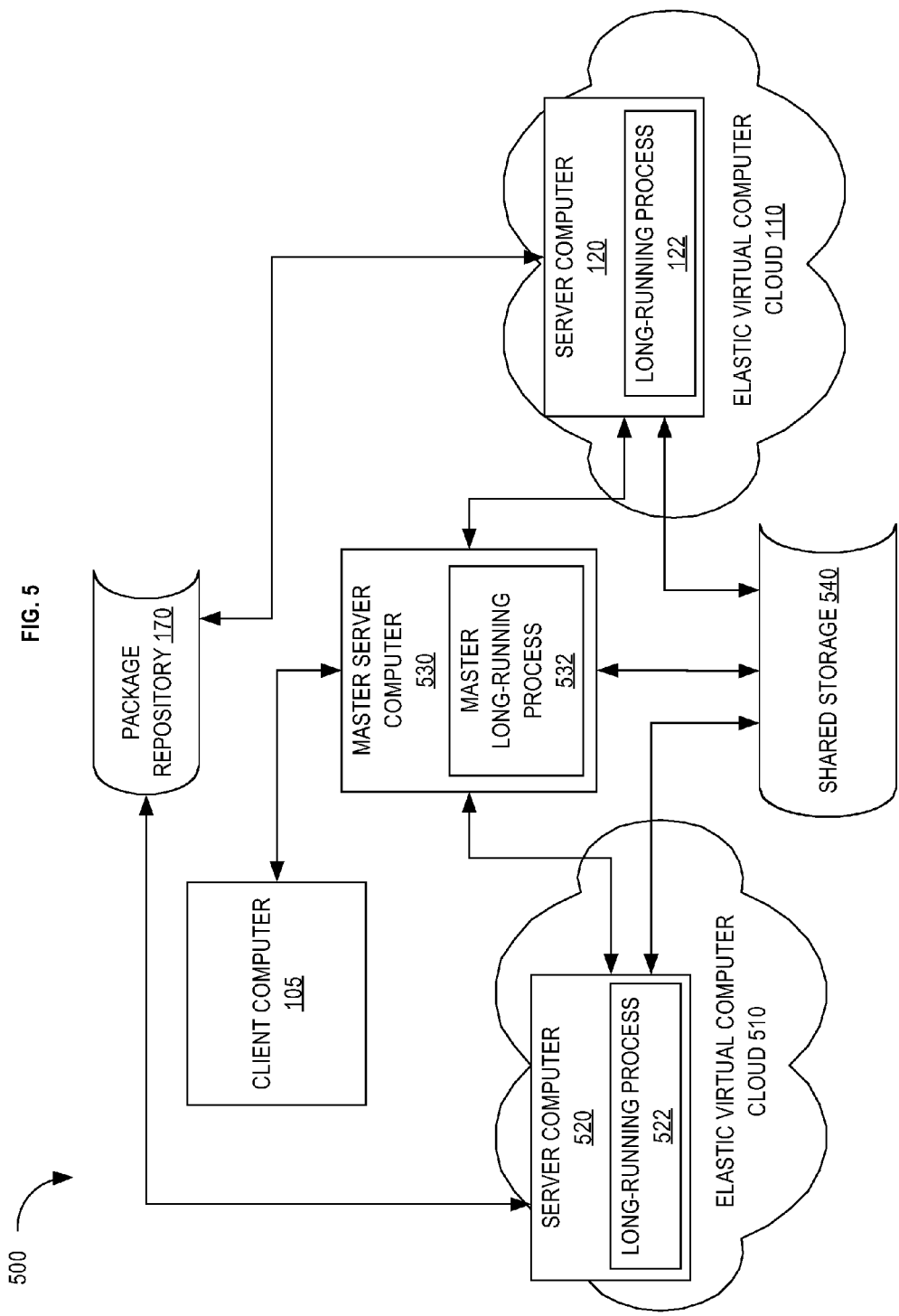
FIG. 5 illustrates a computer system for generating custom virtual computers across multiple elastic virtual computer clouds in multiple geographic regions, according to an embodiment.

FIG. 5 illustrates a computer system for generating custom virtual computers across multiple elastic virtual computer clouds in multiple geographic regions, according to an embodiment. System 500 includes the features in system 100. System 500 also includes master server computer 530, shared storage 540, and elastic virtual computer cloud 510. Elastic virtual computer cloud 510 may include the features illustrated and/or discussed with regard to elastic virtual computer cloud 110. For example, elastic virtual computer cloud 510 includes server computer 520, which may have the same features and functionality as server computer 120, such as a long-running process 522. However, for purposes of illustrating a clear example, the other features included in elastic virtual computer cloud 110 are not illustrated in elastic virtual computer cloud 510. Elastic virtual computer cloud 510 and elastic virtual computer cloud 110 may be owned and/or managed by the same entity, even though elastic virtual computer cloud 510 and elastic virtual computer cloud 110 may include computers in different geographic regions.

Master long-running process 532 is a long-running process that runs on master server computer 530 and receives one or more requests to launch custom virtual computer instances from client computer 105. Master long-running process 532 may cause to one or more launch custom virtual computer instances on elastic virtual computer cloud 110 and/or elastic virtual computer cloud 510, through server computer 120 and server computer 520, respectively. Thus, master long-running process 532 is communicatively coupled with client computer 105, server computer 120, and server computer 520.

Master server computer 530 is illustrated as if remotely coupled to client computer 105, elastic virtual computer cloud 110, and elastic virtual computer cloud 510. However, master server computer 530 may be located on elastic virtual computer cloud 110 or elastic virtual computer cloud 510. Furthermore, master server computer 530 may be the same computer as client computer 105, server computer 520, or server computer 120. Further still, master long-running process 532 may be the same process as long-running process 122 and/or long-running process 522.

Shared storage 540 may be used to store snapshots or exchange other data between elastic virtual computer cloud 110, elastic virtual computer cloud 510, and/or master server computer 530. Shared storage 540 is illustrated as if remotely coupled to elastic virtual computer cloud 110, elastic virtual computer cloud 510, and master server computer 530. However, shared storage 540 may be local to, and/or part of, elastic virtual computer cloud 110, elastic virtual computer cloud 510, and/or master server computer 530. Furthermore, shared storage 540 may be the same computer as any computer in system 500.

Figure 8:
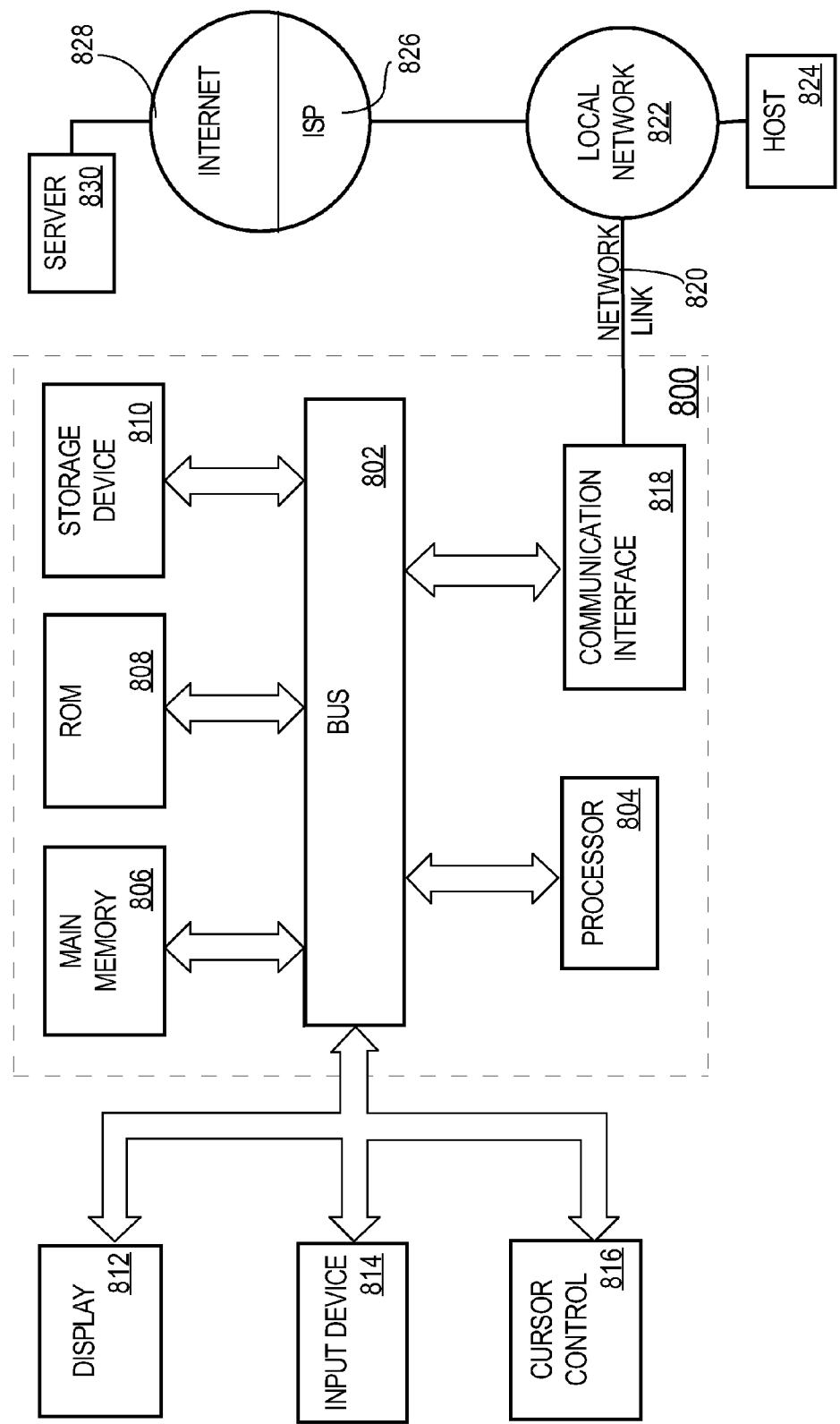
FIG. 8 illustrates a computer system upon which an embodiment may be implemented.

In an embodiment, functional units of master server computer 530 may be implemented using any of the techniques further described herein in connection with FIG. 8; for example, the server computer may comprise a general-purpose computer configured with one or more stored programs which when executed cause performing the functions described herein for the master long-running process 532, or a special-purpose computer with digital logic that is configured to execute the functions, or digital logic that is used in other computing devices.

Figure 6:
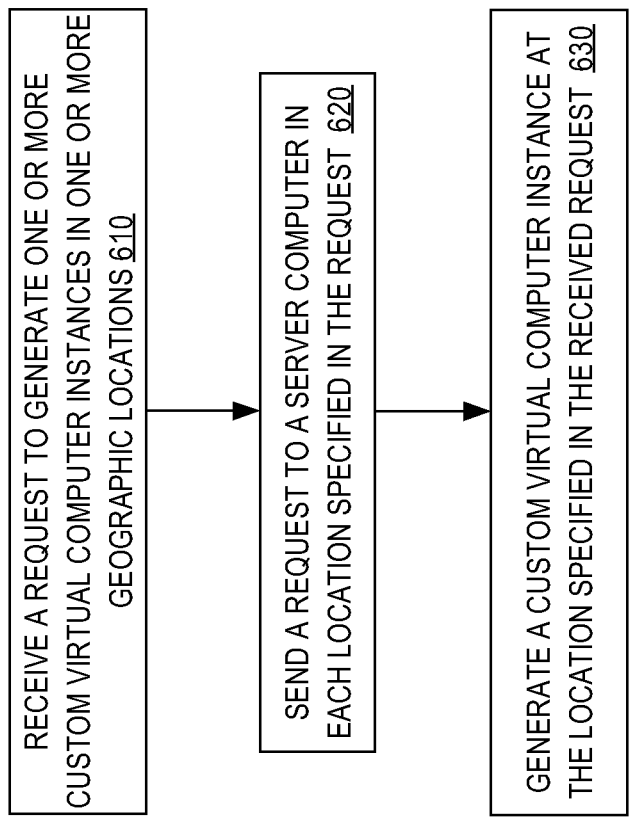
FIG. 6 illustrates a process for automatically generating custom virtual computer instances on multiple elastic virtual computer clouds in different geographic regions, according to an embodiment.

FIG. 6 illustrates a process for automatically generating custom virtual computer instances on multiple elastic virtual computer clouds in different geographic regions, according to an embodiment. In step 610, a master long-running process receives a request to generate one or more custom virtual computer instances in one or more geographic regions. For example, master long-running process 532 may receive a request from client computer 105 to launch a custom virtual computer instance in both Chicago and San Jose. Additionally or alternatively, the request may identify which elastic virtual computer cloud(s) to launch the requested custom virtual computer instance(s) on.

In step 620, the master long-running process sends a request to a server computer in each region specified in the request. For purposes of illustrating a clear example, assume that elastic virtual computer cloud 110 comprises one or more computers located in Chicago, elastic virtual computer cloud 510 comprises one or more computers located in San Jose, and master long-running process 532 maintains a mapping between the elastic virtual computer clouds 110 and 510 and the regions(s) at which each cloud has one or more server computers located at. Based on the mapping, master long-running process 532 may send a first request to long-running process 122 to generate a custom virtual computer instance in Chicago, as defined in the request received in step 610. Master long-running process 532 may send a second request to long-running process 522 to generate a custom virtual computer instance in San Jose, as defined the request received in step 610.

In step 630, each long-running process that receives a request sent in step 620 generates a custom virtual computer instance at the region specified in the received request. For example, long-running process 122 may perform one or more of the methods discussed herein to generate a custom virtual computer instance on a computer that is in Chicago and is in elastic virtual computer cloud 110. Furthermore, long-running process 522 may perform one or more of the methods discussed herein to generate a custom virtual computer instance on a computer that is in San Jose and is in elastic virtual computer cloud 510.

Additionally or alternatively, in response to receiving the first request, long-running process 122 may generate, and take a snapshot of, a volume according to one or more of the methods discussed herein. Long-running process 522 may receive the snapshot generated by long-running process 122 and generate a custom virtual computer instance using the snapshot. For example, long-running process 122 may store the snapshot on shared storage 540. Additionally or alternatively, long-running process 122 may send the snapshot to long-running process 522.

An elastic virtual computer cloud may span more than one geographic region. For example, assume elastic virtual computer cloud 110 has computers that execute custom virtual computer instances in Chicago and Miami. In response to a request from client computer 105 to generate a custom virtual computer instance in Miami, or in the "Southern US" region, master long-running process 122 may launch a custom virtual computer instance on a computer in Miami using one or more of the methods discussed herein.

Regions may be based on cities, states, countries, and/or continents. For example, one elastic virtual computer cloud may support a "European" region", an "Eastern United States" region, a "Western United States" region, and an "Asia" region.

4.4 Providing a Service for Launching Custom Virtual Computer Instances and Generating Custom Snapshots Launching custom virtual computer instances and storing custom snapshots may be provided as a service. For example, a long-running process, and/or another process on a server computer, may provide an API, such as a REpresentational State Transfer ("RESTful") API, to launch one or more custom virtual computer instances, generate custom snapshots, check on the status of a custom virtual computer instance being launched, and/or check on the status of a custom snapshot being generated. Additionally or alternatively, an autonomous application and/or process, such as a source code repository and/or source code repository process, executing on client computer and/or application computer may cause a long-running process on a server computer to generate one or more custom virtual computer instances through the API. Additionally, the API may allow users and/or applications to launch generate, cancel, pause, and/or destroy one or more custom virtual computer instances and/or one or more custom snapshots.

Figure 7:
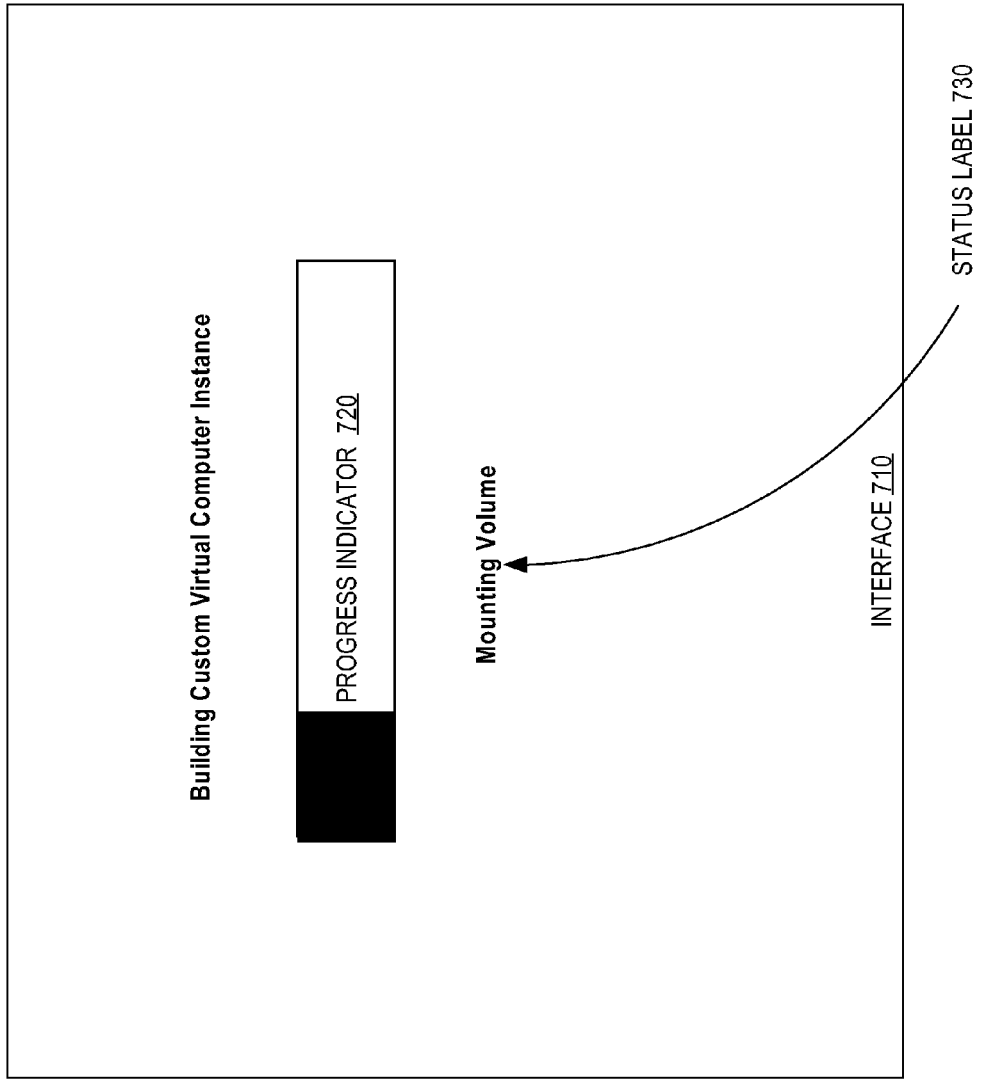
FIG. 7 illustrates an example graphical user interface that may be presented by a client computer, in an example embodiment.

As part of the service, the long-running process may report the progress and/or status of launching a new custom virtual computer instance and/or generating a custom snapshot. FIG. 7 illustrates an example graphical user interface that may be presented by a client computer, in an example embodiment. In the example of FIG. 7, interface 710 may be generated by a long-running process and provided to a client computer for rendering in a browser at the client computer. Additionally or alternatively, interface 710 may be part of a locally installed application program or "app" on the client computer.

In FIG. 7, interface 710 includes progress indicator 720 and status label 730. Progress indicator 720 may visually indicate the progress that one or more long-running processes have made in launching one or more custom virtual computer instances and/or generating a snapshot. Status label 730 may describe the particular stage the one or more long-running processes are at. For example, if a long-running process is mounting a volume to install one or more software packages, then progress indicator 720 may be partially filled, and status label 730 may display the words "Mounting Volume", as illustrated.

The service may provide statistics to an administrator. For example, an administrator may query master long-running process 532 for statistics on how long one or more long-running processes on one or more server computers are taking to launch custom virtual computer instances and/or generate custom snapshots.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

6.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Aspects of the subject matter described herein are set out in the following numbered clauses:

1. A method comprising: using a first server computer, executing a process that is configured to generate virtual computer instances; receiving a request to generate a first custom virtual computer instance, wherein the request identifies one or more software packages to install on the first custom virtual computer instance; copying a first pre-configured volume image onto a volume of a data storage device, wherein the volume includes one or more base software packages in a file system; mounting the volume to the first server computer, in response to receiving the request; installing each of the one or more software packages on the volume; unmounting the volume; creating a snapshot of the volume; registering the snapshot as a registered custom volume image; wherein the process is performed using one or more computing devices.

2. The method any of clause 1, comprising: launching the first custom virtual computer instance from the volume; communicating data indicating that the first custom virtual computer instance is instantiated; receiving, at the process, a second request to generate a second custom virtual computer instance; determining that the second request identifies the one or more software packages installed on the registered custom volume image; in response to determining the one or more software packages are installed on the registered custom volume image: copying the registered custom volume image to a second volume; launching the second custom virtual computer instance from the second volume, without mounting the second volume onto the first server computer, installing the one or more software packages, and unmounting the second volume from the first server computer.

3. The method any of clause 1-2 comprising: receiving a second request to generate a second custom virtual computer instance and identifying the one or more software packages installed on the first custom virtual computer instance; in response to receiving the second request: copying the first pre-configured volume image to a second volume; mounting the second volume that is a copy of the first pre-configured volume image to the first server computer, wherein the second volume includes the one or more base software packages; installing each of the one or more software packages on the second volume; unmounting the second volume; launching the second custom virtual computer instance from the second volume; communicating data indicating that the second custom virtual computer instance is instantiated.

4. The method any of clause 1-3, wherein the request identifies at least a base software package and the one or more base software packages, and the method comprises: maintaining a pool of pre-configured volume images comprising the first pre-configured volume image, wherein each pre-configured volume image of the pre-configured volume images includes a unique set of base software packages that are installed; determining that the one or more base software packages are installed on the first pre-configured volume image; selecting the first pre-configured volume image to copy to the volume based, at least in part, on determining that the one or more base software packages are installed on the first pre-configured volume image.

5. The method any of clause 1-4 comprising: receiving a commit request, at a source code version control server computer, to commit a set of source code to a version control system; committing the set of source code to the version control system; determining that the set of source code was committed successfully, and in response, compiling the set of source code and generating a compiled software package; sending the request to the process to generate the first custom virtual computer instance; wherein the request identifies the one or more software packages that should be installed on the first custom virtual computer instance and includes the compiled software package; installing the compiled software package; running a set of tests against the compiled software package on the first custom virtual computer instance; generating a notification specifying which tests failed, if any.

6. The method any of clause 1-5, wherein the process is a first long-running process of a plurality of long-running processes and each long-running process of the plurality of long-running processes is being executed on a different server computer in a particular geographic region and is capable of launching one or more custom virtual computer instances at the particular geographic region, the request identifies a geographic region, and the method comprises: executing a master process at a master server computer; receiving the request at the master process; determining that the first server computer is located in the geographic region identified in the request; sending the request to the first long-running process, executed by the first server computer, to instantiate the first custom virtual computer instance at the geographic region.

7. The method any of clause 1-6 comprising communicating data indicating a progress state of the process while the process is copying the first pre-configured volume image onto the volume, mounting the volume, installing the one or more software packages, unmounting the volume, and/or launching the first custom virtual computer instance.

8. A non-transitory computer-readable data storage medium storing one or more sequences of instructions which when executed cause one or more processors to perform any of the methods recited in clauses 1-7

9. A computer program product including instructions which, when implemented on one or more processors, carries out any of the methods recited in clauses 1-7.

10. A computing device having a processor configured to perform any of the methods recited in clauses 1-7.

What is claimed is:
1. A method comprising:
using a first server computer, executing a process that is configured to generate virtual computer instances;
receiving a request to generate a first custom virtual computer instance, wherein the request identifies one or more software packages to install on the first custom virtual computer instance;
copying a first pre-configured volume image onto a volume of a data storage device, wherein the volume includes one or more base software packages in a file system;
mounting the volume to the first server computer, in response to receiving the request;
determining a particular operating system is installed on the volume;
selecting, from a plurality of plugins, a particular plugin associated with the particular operating system, wherein each plugin is associated with an operating system of a plurality of operating systems;
causing the particular plugin, in accordance with the particular operating system, to:
change a first root directory on the first server computer to a second root directory on the volume; and
install each of the one or more software packages on the volume relative to the second root directory on the volume;
unmounting the volume;
creating a snapshot of the volume;
registering the snapshot as a registered custom volume image;
wherein the process is performed using one or more computing devices.

2. The method of claim 1 comprising:
launching the first custom virtual computer instance from the volume;
communicating data indicating that the first custom virtual computer instance is instantiated;
receiving, at the process, a second request to generate a second custom virtual computer instance;
determining that the second request identifies the one or more software packages installed on the registered custom volume image;
in response to determining the one or more software packages are installed on the registered custom volume image:
copying the registered custom volume image to a second volume;
launching the second custom virtual computer instance from the second volume, without mounting the second volume onto the first server computer, without installing the one or more software packages, and without unmounting the second volume from the first server computer.

3. The method of claim 1 comprising:
receiving a second request to generate a second custom virtual computer instance and identifying the one or more software packages installed on the first custom virtual computer instance;
in response to receiving the second request:
copying the first pre-configured volume image to a second volume;
mounting the second volume that is a copy of the first pre-configured volume image to the first server computer, wherein the second volume includes the one or more base software packages;
installing each of the one or more software packages on the second volume;
unmounting the second volume;
launching the second custom virtual computer instance from the second volume;
communicating data indicating that the second custom virtual computer instance is instantiated.

4. The method of claim 1, wherein the request identifies at least a base software package and the one or more base software packages, and the method comprises:
maintaining a pool of pre-configured volume images comprising the first pre-configured volume image, wherein each pre-configured volume image of the pre-configured volume images includes a unique set of base software packages that are installed;
determining that the one or more base software packages are installed on the first pre-configured volume image;
selecting the first pre-configured volume image to copy to the volume based, at least in part, on determining that the one or more base software packages are installed on the first pre-configured volume image.

5. The method of claim 1, comprising:
receiving a commit request, at a source code version control server computer, to commit a set of source code to a version control system;
committing the set of source code to the version control system;
determining that the set of source code was committed successfully, and in response, compiling the set of source code and generating a compiled software package;
sending the request to the process to generate the first custom virtual computer instance;
wherein the request identifies the one or more software packages that should be installed on the first custom virtual computer instance and includes the compiled software package;
installing the compiled software package;
running a set of tests against the compiled software package on the first custom virtual computer instance;
generating a notification specifying which tests failed, if any.

6. The method of claim 1, wherein the process is a first long-running process of a plurality of long-running processes and each long-running process of the plurality of long-running processes is being executed on a different server computer in a particular geographic region and is capable of launching one or more custom virtual computer instances at the particular geographic region, the request identifies a geographic region, and the method comprises:
executing a master process at a master server computer;
receiving the request at the master process;
determining that the first server computer is located in the geographic region identified in the request;
sending the request to the first long-running process, executed by the first server computer, to instantiate the first custom virtual computer instance at the geographic region.

7. The method of claim 1 comprising communicating data indicating a progress state of the process while the process is copying the first pre-configured volume image onto the volume, mounting the volume, installing the one or more software packages, unmounting the volume, and/or launching the first custom virtual computer instance.

8. One or more non-transitory computer-readable media storing one or more sequences of instructions which, when executed by one or more computing devices, cause:
using a first server computer, executing a process that is configured to generate virtual computer instances;
receiving a request to generate a first custom virtual computer instance, wherein the request identifies one or more software packages to install on the first custom virtual computer instance;
copying a first pre-configured volume image onto a volume of a data storage device, wherein the volume includes one or more base software packages in a file system;
mounting the volume to the first server computer, in response to receiving the request;
determining a particular operating system is installed on the volume;
selecting, from a plurality of plugins, a particular plugin associated with the particular operating system, wherein each plugin is associated with an operating system of a plurality of operating systems;
causing the particular plugin, in accordance with the particular operating system, to:
change a first root directory on the first server computer to a second root directory on the volume; and
install each of the one or more software packages on the volume relative to the second root directory on the volume;
unmounting the volume;
creating a snapshot of the volume;
registering the snapshot as a registered custom volume image.

9. The one or more non-transitory computer-readable media of claim 8 comprising sequences of instructions which when executed cause:
launching the first custom virtual computer instance from the volume;
communicating data indicating that the first custom virtual computer instance is instantiated;
receiving, at the process, a second request to generate a second custom virtual computer instance;
determining that the second request identifies the one or more software packages installed on the registered custom volume image;
in response to determining the one or more software packages are installed on the registered custom volume image:
copying the registered custom volume image to a second volume;
launching the second custom virtual computer instance from the second volume, without mounting the second volume onto the first server computer, without installing the one or more software packages, and without unmounting the second volume from the first server computer.

10. The one or more non-transitory computer-readable media of claim 8 comprising sequences of instructions which when executed cause:
  receiving a second request to generate a second custom virtual computer instance and identifying the one or more software packages installed on the first custom virtual computer instance;
  in response to receiving the second request:
  copying the first pre-configured volume image to a second volume;
  mounting the second volume that is a copy of the first pre-configured volume image to the first server computer, wherein the second volume includes the one or more base software packages;
  installing each of the one or more software packages on the second volume;
  unmounting the second volume;
  launching the second custom virtual computer instance from the second volume;
  communicating data indicating that the second custom virtual computer instance is instantiated.

11. The one or more non-transitory computer-readable media of claim 8, wherein the request identifies at least a base software package and the one or more base software packages, and comprising sequences of instructions which when executed cause:
  maintaining a pool of pre-configured volume images comprising the first pre-configured volume image, wherein each pre-configured volume image of the pre-configured volume images includes a unique set of base software packages that are installed;
  determining that the one or more base software packages are installed on the first pre-configured volume image;
  selecting the first pre-configured volume image to copy to the volume based, at least in part, on determining that the one or more base software packages are installed on the first pre-configured volume image.

12. The one or more non-transitory computer-readable media of claim 8, comprising sequences of instructions which when executed cause:
  receiving a commit request, at a source code version control server computer, to commit a set of source code to a version control system;
  committing the set of source code to the version control system;
  determining that the set of source code was committed successfully, and in response, compiling the set of source code and generating a compiled software package;
  sending the request to the process to generate the first custom virtual computer instance;
  wherein the request identifies the one or more software packages that should be installed on the first custom virtual computer instance and includes the compiled software package;
  installing the compiled software package;
  running a set of tests against the compiled software package on the first custom virtual computer instance;
  generating a notification specifying which tests failed, if any.

13. The one or more non-transitory computer-readable media of claim 8, wherein the process is a first long-running process of a plurality of long-running processes and each long-running process of the plurality of long-running processes is being executed on a different server computer in a particular geographic region and is capable of launching one or more custom virtual computer instances at the particular geographic region, the request identifies a geographic region, and comprising sequences of instructions which when executed cause:
  executing a master process at a master server computer;
  receiving the request at the master process;
  determining that the first server computer is located in the geographic region identified in the request;
  sending the request to the first long-running process, executed by the first server computer, to instantiate the first custom virtual computer instance at the geographic region.

14. The one or more non-transitory computer-readable media of claim 8 comprising sequences of instructions which when executed cause communicating data indicating a progress state of the process while the process is copying the first pre-configured volume image onto the volume, mounting the volume, installing the one or more software packages, unmounting the volume, and/or launching the first custom virtual computer instance.

15. A system comprising a first server computer with a memory, a processor, a process for generating virtual computer instances, wherein the process is executed by the processor and configured to:
  receive a request to generate a first custom virtual computer instance, wherein the request identifies one or more software packages to install on the first custom virtual computer instance;
  copy a first pre-configured volume image onto a volume of a data storage device, wherein the volume includes one or more base software packages in a file system;
  mount the volume to the first server computer, in response to receiving the request;
  determine a particular operating system is installed on the volume;
  select, from a plurality of plugins, a particular plugin associated with the particular operating system, wherein each plugin is associated with an operating system of a plurality of operating systems;
  cause the particular plugin, in accordance with the particular operating system, to:
  change a first root directory on the first server computer to a second root directory on the volume; and
  install each of the one or more software packages on the volume relative to the second root directory on the volume;
  unmount the volume;
  create a snapshot of the volume;
  register the snapshot as a registered custom volume image.

16. The system of claim 15, wherein the process is further configured to:
  launch the first custom virtual computer instance from the volume;
  communicate data indicating that the first custom virtual computer instance is instantiated;
  receive, at the process, a second request to generate a second custom virtual computer instance;
  determine that the second request identifies the one or more software packages installed on the registered custom volume image, and in response:
  copy the registered custom volume image to a second volume;
  launch the second custom virtual computer instance from the second volume, without mounting the second volume onto the first server computer, without installing the one or more software packages, and without unmounting the second volume from the first server computer.

17. The system of claim 15, wherein the process is further configured to: receive a second request to generate a second custom virtual computer instance and identifying the one or more software packages installed on the first custom virtual computer instance, and in response:
- copy the first pre-configured volume image to a second volume;
- mount the second volume that is a copy of the first pre-configured volume image to the first server computer, wherein the second volume includes the one or more base software packages;
- install each of the one or more software packages on the second volume;
- unmount the second volume;
- launch the second custom virtual computer instance from the second volume;
- communicate data indicating that the second custom virtual computer instance is instantiated.

18. The system of claim 15, wherein the request identifies at least a base software package and the one or more base software packages, and the process is further configured to:
- maintain a pool of pre-configured volume images comprising the first pre-configured volume image, wherein each pre-configured volume image of the pre-configured volume images includes a unique set of base software packages that are installed;
- determine that the one or more base software packages are installed on the first pre-configured volume image;
- select the first pre-configured volume image to copy to the volume based, at least in part, on determining that the one or more base software packages are installed on the first pre-configured volume image.

19. The system of claim 15 comprising:
- a second server computer with a second memory and a second processor;
- a repository process executed by the second processor; wherein the repository process configured to:
- receive a commit request, at a source code version control server computer, to commit a set of source code to a version control system;
- commit the set of source code to the version control system;
- determine that the set of source code was committed successfully, and in response, compiling the set of source code and generating a compiled software package;
- send the request to the process to generate the first custom virtual computer instance, wherein the request identifies the one or more software packages that should be installed on the first custom virtual computer instance and includes the compiled software package;
- wherein the process is further configured to:
- install the compiled software package;
- run a set of tests against the compiled software package on the first custom virtual computer instance;
- generate a notification specifying which tests failed, if any.

20. The system of claim 15, wherein the process is a first long-running process of a plurality of long-running processes and each long-running process of the plurality of long-running processes is being executed on a different server computer in a particular geographic region and is capable of launching one or more custom virtual computer instances at the particular geographic region, the request identifies a geographic region, and the system comprises:
- a master server computer with a third memory and a third processor;
- a master process executed by the third processor and configured to:
- receive the request;
- determine that the first server computer is located in the geographic region identified in the request;
- send the request to the first long-running process, executed by the first server computer, to instantiate the first custom virtual computer instance at the geographic region.

21. The system of claim 15, wherein the process is further configured to communicate data indicating a progress state of the process while the process is copying the first pre-configured volume image onto the volume, mount the volume, install the one or more software packages, unmount the volume, and/or launch the first custom virtual computer instance.

* * * * *